United States Patent Office 3,560,154
Patented Feb. 2, 1971

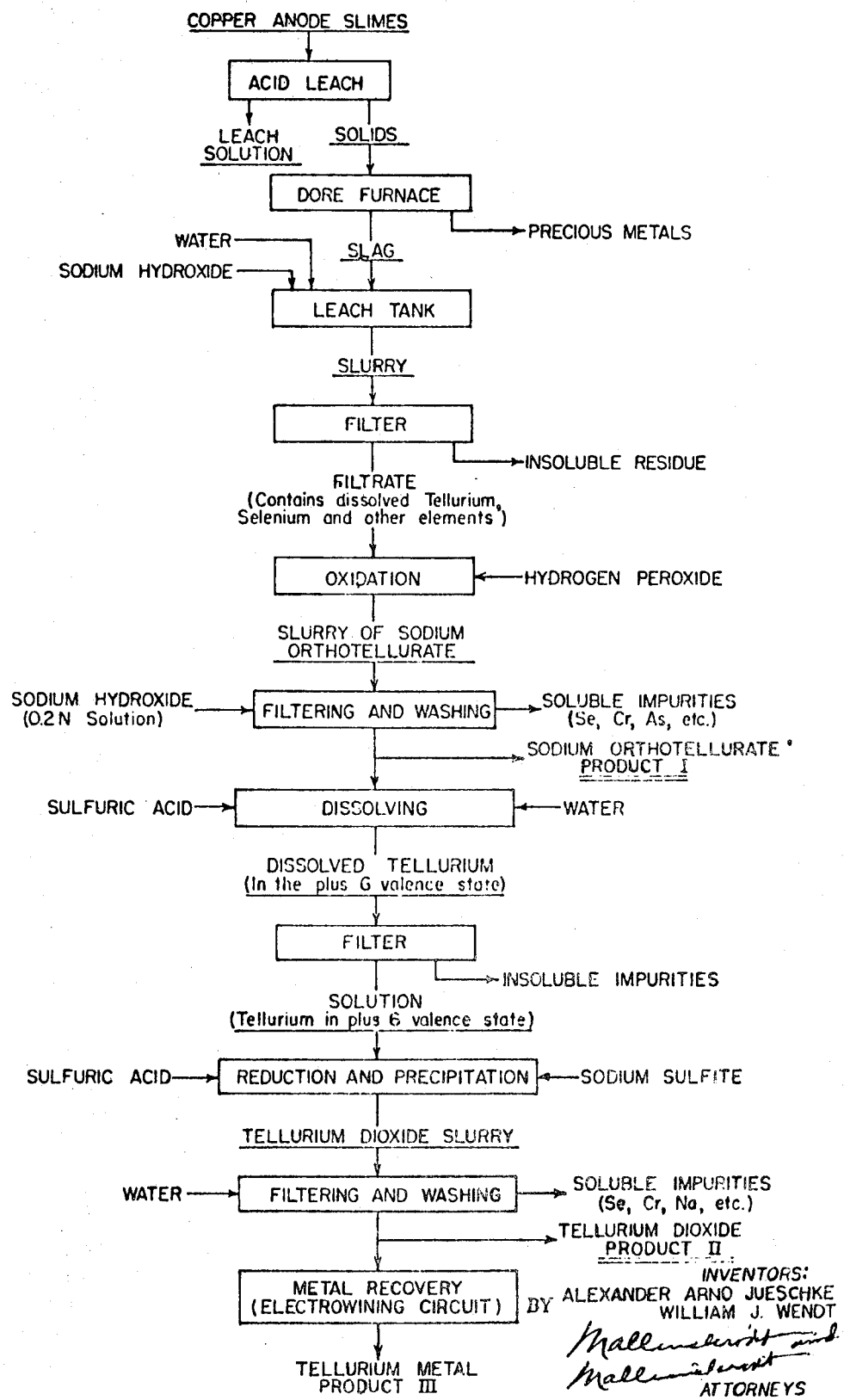

3,560,154
PROCESS FOR PREPARING ALKALI METAL ORTHOTELLURATE AND TELLURIUM DIOXIDE
Alexander Arno Jueschke and William J. Wendt, Salt Lake City, Utah, assignors to Kennecott Copper Corporation, New York, N.Y., a corporation of New York
Continuation-in-part of application Ser. No. 699,282, Dec. 14, 1967. This application May 28, 1969, Ser. No. 830,924
Int. Cl. C01b *19/00;* C01d *11/00;* C22b *7/04*
U.S. Cl. 23—209
17 Claims

ABSTRACT OF THE DISCLOSURE

Alkaline solutions containing tellurium and selenium but substantially free of heavy metal ions, are treated with strong oxidants to precipitate high purity alkali metal orthotellurate at temperatures below the atmospheric boiling point. The orthotellurate may be further treated by contacting it with a reductant to convert tellurium from the +6 valence state to its +4 valence state. The pH is then adjusted to the acid range to precipitate tellurium dioxide of exceptional purity. High purity metallic tellurium may be produced from the tellurium dioxide in accordance with well-known techniques.

RELATED APPLICATION

This application is a continuation-in-part of copending application Ser. No. 699,282, filed Dec. 14, 1967, now abandoned.

BACKGROUND OF THE INVENTION

Field

This invention relates to processes for producing tellurium salts and tellurium metal. It provides an improved process for the purpose, whereby alkali metal orthotellurates are produced and are subsequently converted to tellurium dioxide and, if desired, to metallic tellurium.

Prior art

Tellurium is commercially recovered as a by-product from metallurgical or chemical operations which produce residues or slags containing appreciable amounts of tellurium and other metals, notably selenium. The principal sources of tellurium are the anode muds (sludges or slimes) and Dore furnace slags of the coupper industry, although similar residues are obtained from processes involving the recovery of nickel, cobalt, and other metals.

The chemical compositions of tellurium source materials are highly variable. Tellurium is typically present in amounts ranging from a fraction of a percent to about 10 percent by weight. Dore slags may contain 30 or more percent by weight tellurium in some instances. Selenium may be present in comparable or greater amounts, e.g., up to 30 percent or more by weight. Other metals, such as lead, silver and copper, are often present in major proportions, e.g., 5 to 25 percent or more by weight. Many other elements, such as sodium, silica, antimony, iron, arsenic, magnesium, tin, bismuth, aluminum, nickel, zinc, titanium, platinum, calcium, palladium, sulfur, thallium, gold, and chromium may also be present in various amounts.

Several processes have been proposed for the recovery of tellurium values from anode muds. Dore furnace slags, and other sources, such as flue dusts and lead pit sludges from sulfuric acid plants. In the case of copper anode muds, or other sources relatively rich in selenium, most of the selenium is usually first removed by leaching, sulfate roasting, or other techniques. The residue, which still contains some selenium, is then typically leached with water or dilute caustic solution to extract selenium and tellurium values. Sometimes the muds are first roasted and then are charged to a Dore furnace for the recovery of precious metals. The Dore slag is then similarly leached with water or dilute caustic solution to extract tellurium and selenium. The resulting leach solutions are usually neutralized to precipitate a "neutralized mud" or crude tellurium dioxide product. In either case, the precipitate contains unacceptable quantities of impurities, notably selenium and chromium. High purity tellurium, tellurium dioxide, or orthotellurates are not directly recoverable from such precipitates.

In one such process for separating selenium from tellurium, disclosed in U.S. Pat. No. 2,990,248, source materials containing heavy metal ions, in addition to selenium and tellurium values, are subjected to an oxidizing leach at temperatures of 150° C. to 400° C. under super-atmospheric pressures for periods of from 5 to 72 hours. The selenium is solubilized and the tellurium forms an insoluble heavy metal ion tellurate which must be further processed by known methods to be recovered. There is no disclosure that sodium orthotellurate is formed, as indeed it could not be in the presence of heavy metal ions, or under the relatively high temperatures required in the process.

SUMMARY OF THE INVENTION

According to the present invention, orthotellurates and/or tellurium dioxide of exceptional purity are recovered from alkaline solutions, such as the aforedescribed dilute caustic leach solutions containing virtually no insoluble heavy metal ions. Such a solution is desirably filtered or otherwise treated to remove solids prior to further treatment. In practice, the clear alkaline solution is contacted with a strong oxidant, e.g. hydrogen peroxide, to convert dissolved tellurium values to an alkali metal orthotellurate precipitate at a temperature below the atmospheric boiling point of the solution. Sufficient oxidant is introduced to convert substantially all of the available tellurium to the +6 valence state. The amount of oxidant employed is not critical. Ordinarily an amount at least equal to the amount required to react with all of the dissolved tellurium and other elements in solution is introduced. Lesser amounts, while operable, are not ordinarily as effective or economic. A reasonable excess, e.g. about 10 to about 50 percent, is preferred. Large excesses of oxidant are tolerated by the process.

The precise orthotellurate produced will depend upon the alkali metal hydroxide present in the leach solution. Sodium hydroxide is normally preferred because of its availability and other economic and process considerations. If it is desired to produce an orthotellurate other than sodium orthotellurate, the appropriate hydroxide, i.e., potassium, lithium, rubidium, or cesium hydroxide, or any mixture thereof may be employed. The use of these other hydroxides can introduce complications to the overall process, however. For example, the crystal structure of potassium orthotellurate differs from that of sodium orthotellurate. Moreover, potassium metatellurate may be formed, together with the orthotellurate. Potassium metatellurate is a non-crystalline mass, which is undesirable as an intermediate in the production of tellurium dioxide. Thus, according to the preferred embodiments of this invention, tellurium is extracted by sodium hydroxide leach solutions.

The alkaline, i.e., dilute caustic, solutions typically used to leach tellurium source materials usually contain from about 10 to about 20 percent or more hydroxide in excess of the amount stoichiometrically required to react with all of the compounds in the source material. Such solutions are conveniently treated in the practice of this invention. Water leach solutions may also be treated after the addition of hydroxide thereto. The amount of hydroxide in the solution during the oxidation step is not critical although sufficient hydroxide should be present to maintain the solution in the basic pH range during the oxidizing procedure. In any event, the concentration of sodium or other alkali metal in solution must be sufficiently high to effect the precipitation of the corresponding orthotellurate. Furthermore, it is important that the solution be substantitlly free of insoluble heavy metal ion which could interfere with the formation of the alkali metal orthotellurate by forming an insoluble heavy metal tellurate.

The oxidizing procedure is performed at any convenient temperature below the atmospheric boiling point of the alkaline solution. Depending on the altitude at which the solution is oxidized, the atmospheric boiling point may be as high as 110° C. A preferred temperature range lies between 50° C. and 100° C. Higher temperatures are undesirable, because autoclaves or other pressure devices must be employed; and more importantly, an undesirable half-colloidal or polymerized form of the tellurate appears. As a practical matter, at temperatures below about 20° C. the reaction proceeds so slowly as to be uneconomical.

Strong oxidants, which do not react with constituents of the solution to form interfering precipitates, are preferred. By "strong oxidant" is meant any compound with sufficient oxidation potential to oxidize tellurium to the +6 valence state in the presence of hydroxide.

Strong oxidants are selected from those compounds which have a more negative oxidation potential (E) than the potential, in volts, of the couple $$TeO_3^= + 2(OH)^- \rightarrow TeO_4^= + H_2O + 2e$$

under the conditions of the oxidation step. Such oxidants are readily determined by reference to the data and procedures presented in the book "The Oxidation States of the Elements and Their Potentials in Aqueous Solutions" by Wendell M. Latimer, published by Prentice Hall, New York (2nd ed., 1952). Although the oxidation potentials of some oxidants vary somewhat with pH, suitable oxidants for use in the practice of this invention will ordinarily have an E° more negative than about −0.4. The highly preferred strong oxidants are hydrogen peroxide and compounds which provide hydrogen peroxide to the solution without providing cations which react with solution constituents to form insoluble compounds. Sodium peroxide is a useful oxidant, for example. Barium peroxide, although operable, is not as desirable because it reacts to form insoluble barium compounds. The halogens, notably chlorine, bromine, and iodine, but including fluorine, are also useful. Hydroxylamine and the soluble hypochlorites, bromates, and iodates of cations which do not react with solution constituents to form precipitates are further examples of useful oxidants. Although potassium and lithium salts are generally sufficiently soluble for use, the sodium salts are more readily available and are thus preferred. These oxidants are effective at ambient temperatures and pressures, although elevated temperatures below the normal boiling point of the solutions are within contemplation. Ozone and oxygen are also useful strong oxidants. Other suitable oxidants may be determined by those skilled in the art by following the teachings of this disclosure and by reference to Latimer or other available literature concerning oxidation potentials.

The time required to oxidize substantially all of the tellurium in solution to the orthotellurate form is less than two hours. In the presence of stoichiometric excess of strong oxidizing agent, the oxidation step usually requires approximately 30 minutes.

Following the oxidation procedure, the orthotellurate precipitate is separated, usually by filtration, from the leach solution. The precipitate is washed as required to remove occluded impurities. Water or alkaline aqueous media are preferred for this purpose. The washed precipitate consists essentially of alkali metal orthotellurate, other elements remaining in solution. Orthotellurates produced in this fashion are of exceptionally high purity. Purities in excess of 99.5 often above 99.9 percent by weight, are routinely achieved. Typical assays of sodium orthotellurate product, for example, have revealed a combined weight of less than 0.05 percent selenium and chromium. The orthotellurate product may either be marketed or used as raw material for the production of high purity tellurium dioxide. If desired, orthotellurate product may be redissolved and reprecipitated to further enhance its purity.

To produce high purity tellurium dioxide, the orthotellurate is first introduced into an aqueous medium. The amount of aqueous medium per pound of orthotellurate is not critical. Sufficient medium should be present to accept the available tellurium into solution, either initially or after it is solubilized. The tellurium-bearing aqueous medium is contacted with a reducing agent to reduce tellurium from its +6 valence state to its +4 valence state. The preferred reductants for this purpose are those which accomplish the desired reduction without reacting with solution constituents to form interfering precipitates.

Suitable reducing agents are selected in the same fashion as are suitable oxidizing agents, except that the oxidation potential of the reducing agent should be positive with respect to the potential of the couple $$TeO_3^= + 2(OH)^- \rightarrow TeO_4^= + H_2O + 2e$$

Thus, values of E° for the reducing agent will normally be more positive than −0.4. Highly preferred reducing agents include sulfur dioxide gas, and the alkali metal sulfites, bisulfites, metabisulfites and thiosulfates. The sodium salts are usually preferred because of their cost and availability. Corresponding water soluble potassium and lithium salts can also be employed, if desired. Other suitable reductants include various metals, such as sodium, lithium and potassium, in addition to metallic tellurium. Thus, for example, electrolytic tellurium metal of less than commercial purity may be introduced into an acidified solution of orthotellurate to reduce the orthotellurate to tellurium dioxide. Pressurized hydrogen gas can also be used to advantage under certain circumstances. Other useful reducing agents can be readily determined by those skilled in the art following the teachings of this disclosure.

The aqueous medium may be alkaline, neutral, or acidic. In alkaline media, the orthotellurate remains in solid state slurried with the liquid phase. The orthotellurate dissolves in either neutral or acid media. As in the case of the oxidizing step described hereinbefore, the quantities of the reagents used are not critical. Sufficient reductant is preferably employed to convert most or all of the tellurium from its +6 valence state to its +4 valence state. If desired, the orthotellurate can be contacted with sufficient strong reductant to reduce it to the metal. Metallic tellurium produced in this fashion is of higher purity than the crude tellurium metal produced by the prior art processes. In most instances, it is preferred to employ a quantity of reductant which will result in substantially complete reduction of the orthotellurate to tellurium dioxide with little or no tellurium metal. It is normally not difficult to avoid reducing the tellurium dioxide to tellurium metal. Even when sufficient strong reductant is employed to produce a substantial amount of tellurium metal, the thus-produced tellurium may be reacted with an acidified solution of orthotellurate to produce tellurium dioxide. Usually it is desirable to add a reasonable excess of the reductant, e.g., about 5 to about 10, rarely more than about 50 percent, depending upon the specific reductant employed. Useful temperatures range from ambient or below to the boiling point of the aqueous medium. A more desirable product in terms of its filterability is obtained when the aqueous medium is between about 40°

C. to about 90° C. preferably above about 50° C., at least at the completion of the reduction.

One specific reduction procedure comprises dissolving sodium orthotellurate in water maintained at a temperature between about 50° and about 70° C. Sodium sulfite is then added to the aqueous solution in an amount at least equal to the amount required to react with all of the orthotellurate which is dissolved. Excess sodium sulfite is desirably added to the solution. The reaction is enhanced by stirring or equivalent agitation.

After the reduction step is completed, the pH of the solution is adjusted to the acid range to precipitate tellurium dioxide. Tellurium dioxide is quite soluble in strong acids, but is less soluble as the pH increases. A useful pH range for this invention is between about pH 4 through pH 7. A better range from the standpoint of low tellurium dioxide solubility is pH 5 through about pH 6.5 with the range pH 6.2 through pH 6.5 being considered ideal. The precipitate is recovered typically by filtration. It is then washed as required to remove occluded impurities. The preferred washing medium for this purpose is water, although in some instances dilute mineral acid solutions, e.g., hydrochloric, nitric, or sulfuric acid in water, can be employed. An acid wash should ordinarily have a pH no lower than about pH 4. The washed precipitate is substantially pure tellurium dioxide, other elements remaining dissolved in the filtrate.

The tellurium dioxide produced by this invention is unique. Both the oxidation and the reduction steps are highly effective in the separation of tellurium values from impurities. Thus, the tellurium dioxide produced in accordance with this invention has physical properties which are especially advantageous during subsequent handling and purification operations. Because of its granular nature, it is more readily filtered and washed than are tellurium dioxide products produced by prior art processes. Accordingly, this invention provides an economically attractive process for producing high purity tellurium dioxide, which can then be reduced by conventional chemical, pyrometallurgical, or electrolytic methods to produce high purity metallic tellurium. Metallic tellurium, tellurium dioxide, and orthotellurate salts are all useful in the production of special purpose alloys as well as solid state materials used by the electronics industry.

Recovery of metallic tellurium from the tellurium dioxide produced by the practice of this invention may be accomplished by any convenient conventional technique. For example, metallic tellurium of 99.9 percent by weight purity is readily obtained by dissolving the tellurium dioxide of this invention in an aqueous solution of an alkal metal hydroxide, e.g., sodium hydroxide or potassium hydroxide, and electrowinning the tellurium. Even higher purity tellurium is obtained in this fashion if the orthotellurate is redissolved, in an aqueous medium, and re-precipitated prior to its being converted to tellurium dioxide. One suitable purification procedure is to slurry the orthotellurate in warm water e.g., to a solids content of about 10 percent. The pH of the alkaline slurry is adjusted to below about 7.5, typically about 6.5 to about 7.5 by the addition of a mineral acid. The insoluble residue is filtered off and alkali metal hydroxide is added to the filtrate to cause the re-precipitation of orthotellurate.

It should be noted that the processes taught by the present invention can be conducted at atmospheric pressure, in conventional process equipment, using readily available reagents, and employing convenient and normal process temperatures. Neither the oxidation step nor the reduction step requires any elaborate or precise process control. The pH adjustment following the reduction step is also accomplished by the use of available inexpensive reagents, such as the mineral acids. Accordingly, the present invention provides a means for the removal of impurities from tellurium values which is rapid, inexpensive, and more effective than even much more complicated prior art methods. The invention can be practiced as either a batch or a continuous operation.

THE DRAWING

The drawing is a flow sheet illustrating one specific embodiment that is presently contemplated as the best mode of carrying out this invention.

DETAILED DESCRIPTION OF THE ILLUSTRATED EMBODIMENT

Referring to the flow sheet, anode slimes from an electrolytic copper recovery circuit are treated by a standard acid leach. The leach solution is filtered and the solid residue is sent to a Dore furnace. The slag from the Dore furnace is then leached with water or a dilute caustic soda solution to dissolve tellurium, selenium and other elements, thereby forming an alkaline solution. The leach solution is filtered to remove objectionable precipitated matter including insoluble heavy metal ions that would interfere with the process. The filtrate recovered has the following approximate composition.

| Component: | Grams per liter |
|---|---|
| Tellurium | 65 |
| Selenium | 30 |
| Chromium | 5 |
| Lead | 0.1 |
| Copper | 0.1 |
| Antimony | 0.1 |

The concentrations of the insoluble heavy metal ion, such as lead, copper and antimony, are typically much lower than 0.1 g.p.l. However, concentrations up to about 0.1 g.p.l. can be accommodated by the process without adverse effects.

The filtrate is mixed in an oxidation vessel with the oxidant. About 0.88 pound of 35% hydrogen peroxide is used for each pound of tellurium in solution. The temperature of the contents of the vessel is maintained at about 60° C. for at most two hours.

The precipitated sodium orthotellurate is filtered and washed freely with 0.2 sodium hydroxide solution. The filter cake has the following approximate composition.

| Component: | Percent by weight (dry basis) |
|---|---|
| Water (occluded) | 20 |
| Al | 0.02 |
| As | 0.05 |
| Bi | 0.02 |
| Ca | 0.01 |
| Cr | 0.002 |
| Cu | 0.006 |
| Fe | 0.03 |
| Mg | 0.01 |
| Mn | 0.005 |
| Mo | 0.01 |
| Na | 16 |
| Pb | 0.08 |
| Sb | 0.05 |
| Se | 0.05 |
| Si | 0.04 |
| Te | 45 |
| Zn | 0.006 |

The sodium orthotellurate is slurried with water and dissolved with sulfuric acid, resulting in a solution containing about 50 g./l. tellurium at a pH of about 6. A small amount of insoluble impurities is present in the solution. The solution is filtered to remove the insoluble impurities and then is mixed with sodium sulfite in an agitated reduction vessel. About 1 pound of sodium sulfite is used for each pound of tellurium in solution. The temperature of the contents of the vessel is maintained at about 60° C. for at most about 2 hours. At the completion of the reduction, sulfuric acid is added to adjust the pH to from 6.2 to 6.5. The precipitated tellurium dioxide is filtered and washed with water. The resulting filter cake has the following approximate analysis.

| Component: | Percent by weight (dry basis) |
|---|---|
| Water (occluded) | 20 |
| Al | 0.01 |
| As | 0.02 |
| Bi | 0.002 |
| Ca | 0.005 |
| Cr | 0.001 |
| Cu | 0.005 |
| Fe | 0.01 |
| Mg | 0.005 |
| Pb | 0.001 |
| Sb | 0.02 |
| Se | <0.01 |
| Si | 0.01 |
| Te | [1] >78.5 |
| Na | 0.15 |

[1] 100% pure $TeO_2$ is 79.97% Te.

The tellurium dioxide is dissolved in sodium hydroxide solution. Using the sodium hydroxide solution as an electrolyte, metallic tellurium is recovered by conventional electrowinning techniques. The metal has the following approximate analysis.

| Component: | Percent |
|---|---|
| Ag | <0.00005 |
| Al | 0.0005 |
| As | <0.0005 |
| Bi | <0.0002 |
| Ca | 0.001 |
| Cr | 0.0005 |
| Cu | 0.002 |
| Fe | 0.002 |
| Mg | 0.002 |
| Mn | 0.001 |
| Mo | 0.001 |
| Na | 0.05 |
| Ni | 0.002 |
| Pb | 0.0005 |
| Sb | 0.0004 |
| Si | 0.001 |
| Se | <0.01 |
| Zn | 0.002 |

Reference herein to details of the presently preferred embodiments is not intended to limit the scope of the claims. Many modifications will occur to those skilled in the art.

What is claimed is:

1. In the recovery of tellurium values from alkali metal hydroxide solutions of tellurium and selenium values which solutions are substantially free of insoluble heavy metal ions, the improvement which comprises introducing a strong, soluble oxidant to the solution at a temperature within the range of about 20° C. to about 110° C. at atmospheric pressure, for a period of up to about two hours to form selectively a precipitate of alkali metal orthotellurate having an easily filterable crystalline structure and recovering said orthotellurate.

2. The improvement of claim 1, wherein the recovered orthotellurate is re-dissolved in an acid or neutral aqueous medium; the resulting orthotellurate solution is filtered; and alkali metal hydroxide is introduced to the filtrate to reprecipitate orthotellurate.

3. The improvement of claim 1, wherein the alkali metal hydroxide solution is a sodium hydroxide solution and the orthotellurate precipitate is sodium orthotellurate.

4. The improvement of claim 3, wherein the strong oxidant is one which provides hydrogen peroxide to the solution.

5. The improvement of claim 4, wherein the sodium orthotellurate is recovered by filtering it from the alkali metal solution and then washing it to remove occluded impurities.

6. The improvement of claim 1, wherein the orthotellurate is contacted with sufficient reducing agent in an aqueous medium to produce tellurium metal.

7. The improvement of claim 1, whereby tellurium dioxide is produced from caustic leach solutions containing tellurium values, which comprises contacting the leach solution with sufficient strong oxidant to form a precipitate of sodium orthotellurate; recovering said sodium orthotellurate precipitate; washing said precipitate to remove occluded impurities; introducing the washed precipitate to an aqueous medium; contacting said aqueous medium with sufficient reducing agent to convert tellurium values in said medium from the +6 valence state to the +4 valence state; adjusting the pH of said aqueous medium to the acid range to form a precipitate of tellurium dioxide; and recovering the tellurium dioxide precipitate.

8. The improvement of claim 7, wherein the washed orthotellurate precipitate is re-dissolved in an acid or neutral aqueous medium; the resulting solution is filtered; and the filtrate is contacted with sodium hydroxide to reprecipitate sodium orthotellurate, thereby to further reduce the impurities in the orthotellurate before it is contacted by the reducing agent.

9. The improvement of claim 7, wherein the strong oxidant is one which provides hydrogen peroxide to the solution.

10. The improvement of claim 9, wherein the reducing agent is selected from the group consisting of sulfur dioxide gas, the alkali metal sulfites, the alkali metal bisulfites, the alkali metal metabisulfites and the alkali metal thiosulfates.

11. The improvement of claim 10, wherein the orthotellurate precipitate is introduced to an aqueous medium; and sodium sulfite is introduced to the medium to reduce the tellurium to its +4 valence state, the temperature of the medium being between about 40° and about 90° C. at the completion of the reduction.

12. The improvement of claim 11, wherein the temperature of the medium is between about 50° and about 70° C. at the completion of the reduction.

13. The method of claim 11, wherein the aqueous medium is about neutral in pH.

14. The method of claim 10, wherein the pH of the aqueous medium is adjusted to between about 5 and about 6.5 to cause the precipitation of tellurium dioxide.

15. The method of claim 14, wherein the pH of the aqueous medium is adjusted to between about 6.2 and about 6.5.

16. The method of recovering tellurium values from Dore furnace slag, which comprises contacting said slag with dilute caustic leach solution containing sufficient sodium hydroxide to react with at least the tellurium and selenium values in the slag thereby to leach tellurium and selenium values and other elements from the slag; filtering the resulting slurry to remove solids therefrom and to provide a solution of tellurium and selenium values that is substantially free of insoluble heavy metal ions; contacting the filtered leach solution with a strong, soluble oxidant that provides peroxide at a temperature within the range of about 20° C. to about 110° C., at atmospheric pressure, for a period of up to about two hours to form a precipitate consisting essentially of pure sodium orthotellurate; filtering and washing the sodium orthotellurate; dissolving the washed sodium orthotellurate in water; establishing the temperature of the resulting sodium orthotellurate solution between about 40° and about 90° C.; introducing to the sodium orthotellurate solution at least the amount of sodium sulfite required stoichiometrically to convert all of the tellurium to its +4 valence state; adjusting the pH of the solution to between about 6.2 and about 6.5, thereby to form a precipitate of tellurium dioxide; and recovering the precipitated tellurium dioxide.

17. The method of recovering tellurium values from aqueous sodium hydroxide solutions containing dissolved tellurium values and being substantially free of insoluble heavy metal ions, which comprises contacting the solution with a strong, soluble oxidant to selectively precipitate the tellurium as sodium orthotellurate at a temperature within the range of about 20° C. to about 110° C., at atmospheric pressure, for a period of up to about two hours; filtering and washing the precipitate to remove occluded impurities, thereby to recover a washed precipitate consisting essentially of sodium orthotellurate; treating said washed precipitate in an aqueous medium with a reducing agent to produce a solution of tellurium in the +4 valence state; acidifying said solution to selectively precipitate the tellurium as tellurium dioxide; and filtering and washing the tellurium dioxide precipitate to remove occluded impurities thereby to produce a substantially pure tellurium dioxide product.

References Cited
UNITED STATES PATENTS

| | | | |
|---|---|---|---|
| 2,990,248 | 6/1961 | Vaaler | 23—139 |
| 3,127,244 | 3/1964 | Elkin et al. | 23—209 |

OSCAR R. VERTIZ, Primary Examiner

H. S. MILLER, Assistant Examiner

U.S. Cl. X.R.

23—50, 139; 75—99